United States Patent [19]
Pischke et al.

[11] Patent Number: 5,255,642
[45] Date of Patent: Oct. 26, 1993

[54] METHOD AND ARRANGEMENT FOR A DELAYED SHUTOFF OF CONTROL APPARATUS OF AN INTERNAL COMBUSTION ENGINE

[75] Inventors: Jürgen Pischke, Weissach; Herbert Arnold, Eberdingen, both of Fed. Rep. of Germany

[73] Assignee: Robert Bosch GmbH, Stuttgart, Fed. Rep. of Germany

[21] Appl. No.: 805,958

[22] Filed: Dec. 12, 1991

[30] Foreign Application Priority Data

Dec. 12, 1990 [DE] Fed. Rep. of Germany ....... 4039599

[51] Int. Cl.$^5$ ............................................. F02D 45/00
[52] U.S. Cl. ........................... 123/179.3; 123/198 DC
[58] Field of Search .......... 123/179.3, 198 DC, 179.4; 73/118.2

[56] References Cited

U.S. PATENT DOCUMENTS

| | | | |
|---|---|---|---|
| 4,364,343 | 12/1982 | Malik | 123/198 DC |
| 4,741,313 | 5/1988 | Shimomura | 73/118.2 |
| 4,756,185 | 7/1988 | Shimomura | 73/118.2 |
| 4,796,588 | 1/1989 | Shimomura et al. | 123/479 |
| 4,902,956 | 2/1990 | Sloan | 320/13 |
| 5,024,205 | 6/1991 | Gatza et al. | 123/632 |

FOREIGN PATENT DOCUMENTS

| | | |
|---|---|---|
| 2117835 | 10/1983 | United Kingdom . |
| WO90/01435 | 2/1920 | World Int. Prop. O. . |
| WO90/02670 | 3/1990 | World Int. Prop. O. . |

Primary Examiner—Andrew M. Dolinar
Attorney, Agent, or Firm—Walter Ottesen

[57] ABSTRACT

The invention is directed to a method for operating control apparatus during delayed shutoff after switching off the ignition of an internal combustion engine. This method protects the battery as far as possible and for this method, three principles are applied individually or in any desired combination but preferably all together. The first principle provides that the delayed-shutoff functions are no longer carried out, as has been conventional, until a fixed pregiven time duration is reached; instead, the functions are either interrupted when values of special variables reach a fixed pregiven threshold or a threshold fixed in dependence upon operating variables in advance of switch-off of the engine is reached. The particular monitored physical variable and the threshold value corresponding thereto are each so selected that, when the actual value reaches the threshold value and accordingly, the delayed-shutoff function is interrupted or not even started, this occurs without essentially influencing the new start capacity of the engine. The second principle provides that delayed-shutoff functions, and especially those which require a high current flow, are not carried out simultaneously but instead sequentially. The third principle provides that the current-supplying capacity of the battery is monitored and as soon as it becomes apparent that this current-supplying capacity is just sufficient for a new start of the cooled-down engine, the delayed-shutoff functions are interrupted or not even begun.

13 Claims, 2 Drawing Sheets

METHOD AND ARRANGEMENT FOR A DELAYED SHUTOFF OF CONTROL APPARATUS OF AN INTERNAL COMBUSTION ENGINE

FIELD OF THE INVENTION

The invention relates to a method and arrangement for control apparatus during a delayed-shutoff phase after the ignition of an internal combustion engine has been switched off.

BACKGROUND OF THE INVENTION

For more than a decade, it has been conventional to operate control apparatus during delayed shutoff after the ignition of an engine has been switched off in order to provide for specific conditions which are advantageous for a renewed start of the engine and the further operation thereof. These conditions include especially a monitoring as to whether conditions are present with respect to the engine which require a hot start. It is conventional to burn off the hot wire in the delayed-shutoff phase on internal combustion engines having a hot-wire air-flow sensor. For this purpose, a method is available developed over a decade ago according to which the wire is not burned off with the same intensity in each delayed-shutoff phase to increase its operational life; instead, an intense burn-off operation always takes place only after several weaker burn-off operations. Furthermore, it is possible in the delayed-shutoff phase to statistically evaluate data from the previous operating cycle in order to obtain, for example, adaptation values for improved further operation.

All known delayed-shutoff methods operate in such a manner that for ending all delayed-shutoff functions, the time span elapsed since switch-off of the ignition is measured and delayed-shutoff functions are terminated after pregiven time spans have elapsed. At the beginning of the delayed-shutoff phase, all functions are started such as the following: time measuring functions for the hot start, the burn-off of a hot-wire air-flow sensor, the displacement of the throttle flap in the event that the latter is electrically controlled from a completely closed condition into such a position in which the throttle flap cannot become jammed and the statistical evaluation of data and the like.

It has been shown that there are always cases, although fortunately few in number, wherein experiments have shown that, when the engine was operated without a delayed-shutoff phase, it is easier to start the engine again than if the delayed-shutoff functions had been performed.

SUMMARY OF THE INVENTION

In view of the foregoing, it is an object of the invention to provide a method for operating control apparatus during the delayed-shutoff phase and after switch-off of the ignition of an internal combustion engine which makes possible a reliable new start of the engine in even more cases than was previously possible.

The applicants have determined that the problems occurring from time to time described above are observed mostly when very low operating temperatures are present or the battery for the engine shows a poor charging condition.

In the embodiments of the method of the invention, the idea is common to all embodiments that control apparatus is so operated during delayed shutoff that the battery remains protected as much as possible. This takes place in that delayed-shutoff functions needing a high current flow are only carried out sequentially and/or that the delayed-shutoff functions are interrupted as soon as possible which can be effected in that values of pregiven magnitude are measured and compared to threshold values and that, in the case of a match between the measured value and the threshold value, the particular delayed-shutoff function is interrupted. A further measure is seen in that the current-supplying capacity of the battery is monitored and the delayed-shutoff function is interrupted or is not even started when the battery is in a condition which is critical for a new start.

A first method for operating control apparatus in a delayed-shutoff phase after the ignition of the engine is switched off includes steps for ending individual delayed-shutoff functions or preventing the same from the start of the delayed-shutoff phase. These method steps include presetting a threshold value of a variable which is so selected that when the actual value of the variable reaches the threshold value, the particular delayed-shutoff function is terminated without substantially deteriorating the operability of the engine; monitoring the value of the variable during delayed shutoff; and ending the particular delayed-shutoff function when the measured value reaches the threshold value.

A second embodiment of the invention includes steps for prematurely ending the delayed-shutoff functions or preventing the same from the start of the delayed-shutoff phase. This embodiment includes the method steps of: monitoring the current-supplying capacity of the battery; ending the delayed-shutoff function or preventing the start thereof when the current-supplying capacity of the battery and/or the outside temperature have such values that the current-supplying capacity of the battery is only sufficient to start the cooled-down engine again.

A third embodiment of the invention provides that, if several delayed-shutoff processes requiring a high current flow are present, then these processes are carried out sequentially.

The above-mentioned embodiments of the method can be combined with each other in any desired manner. It is especially advantageous to utilize all three embodiments together.

The battery can be protected considerably when the delayed-shutoff functions are not required to be run through over a pregiven time; instead, the delayed-shutoff functions are ended as soon as there is no danger that ending the function would significantly affect the operation of the engine or when the functions are not even carried out. For example, it is customary to maintain the delayed-shutoff function for the hot start for over an hour even when the ignition was running at low load before the engine was switched off, that is, the engine had hardly warmed. If, in contrast, the first one of the above-mentioned methods is utilized, then the engine temperature is selected as the variable to determine if the delayed-shutoff function is to take place. The actual value of the engine temperature is continuously compared to a threshold value and the hot-start delayed-shutoff function is only then carried out when and only so long as the actual temperature is above the threshold value.

The example provided above for a variation of the first method proceeds from a fixed threshold value. It is however also possible to determine the threshold value in dependence upon operating conditions in advance of the switch-off of the engine. Accordingly, one variation of the first method provides that the duration of burn-off of the hot wire of the air-flow sensor is dependent upon the length of time that the engine was operated in advance of switch-off. This not only protects the battery but also contributes to lengthening the service life of the hot wire.

In the third embodiment of the invention described above according to which the delayed-shutoff methods requiring high current flow are no longer run in parallel starting from the switch-off of the ignition; instead, they run sequentially which leads to a protection of the battery since it is known that a higher current flow over a short time does more damage to a battery than a low current flow over a longer time with the same total amount of energy. This procedure is especially advantageous for an engine having two cylinder banks with each having respective air-flow sensors wherein respective hot wires are to be burned off. The sequence of the method is dependent upon its significance for the further good operability of the engine; that is, it is to be fixed in accordance with the particular application.

Monitoring of the current-supplying capacity of the battery, as in the second embodiment of the method of the invention, is carried out in that, for example, the voltage drop of the battery is measured during a short term pregiven load, for example, for a short term burn-off of the hot wire. With this measurement, the effects on the charging condition and temperature are detected simultaneously. It is however relatively difficult to obtain reliable values with such a method. Measurements of the ambient temperature and/or of the load condition are more reliable although more complex. The load condition can be very precisely detected via the concentration of the battery acid which, in turn, is detectable with the aid of a measurement of the conductivity which is relatively simple to carry out. Irrespective of how the current-supplying capacity is detected, it is essential for the second embodiment of the method of the invention that the delayed-shutoff functions are only then carried out when there is no danger that the battery will become so greatly loaded that thereafter the engine cannot be started notwithstanding start values well adapted during delayed shutoff.

The first embodiment of the arrangement of the invention for operating at least one control apparatus in a delayed-shutoff phase after switch-off of the ignition of an engine includes: a delayed-shutoff variable comparator for ending individual delayed-shutoff functions or preventing the same from the start of the delayed-shutoff phase with the comparator continuously comparing the actual value of a particular delayed-shutoff variable to a threshold value; means for emitting a signal for terminating the particular delayed-shutoff function when the actual value reaches the threshold value. The delayed-shutoff variable is a variable which is so selected that, when its actual value reaches the threshold value, the particular delayed-shutoff function can be terminated without significant deterioration of the operability of the engine.

The second embodiment of the arrangement of the invention for operating at least one control apparatus in a delayed-shutoff phase after switching off the ignition of the engine includes: battery monitoring means for ending individual delayed-shutoff functions or preventing the same from the start of the delayed-shutoff phase with the battery condition monitoring means emitting a signal for ending the delayed-shutoff functions or preventing the same from the start thereof when the current-supplying capacity of the battery essentially is only adequate for again starting the engine.

The third embodiment of the arrangement of the invention for operating at least one control apparatus in a delayed-shutoff phase after the ignition of an engine is switched off includes a sequence control for sequentially carrying out especially those delayed-shutoff functions which require a high current flow.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
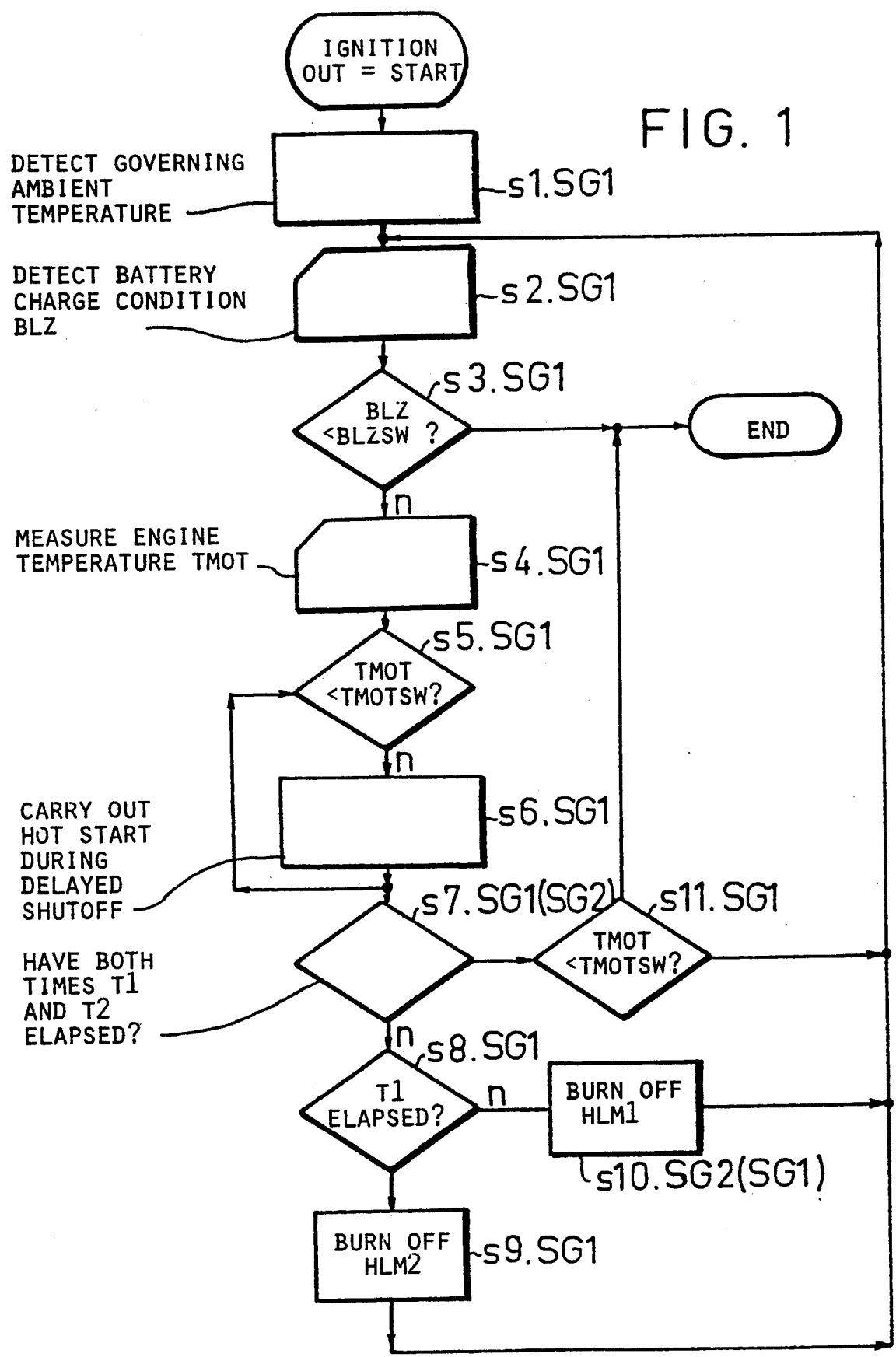
FIG. 1 is a flowchart for explaining one embodiment of the method of the invention for operating control apparatus in a delayed-shutoff phase with optimal protection of the battery; and, FIG. 2 is a block diagram of an arrangement for the delayed-shutoff control of an engine having two control apparatus.

The flowchart according to the embodiment of FIG. 1 includes eleven method steps s1 to s11. An internal combustion engine has two cylinder banks and two control apparatus SG1 and SG2 for the respective banks. The term s1.SG1 means that the first step is considered in the method sequence and that this step is carried out by the first control apparatus SG1. The term s7.SG1(SG2) identifies the seventh method step which is carried out by the first control apparatus SG1 from its own information and additional information from control apparatus SG2.

In the first method step s1, after the start of the delayed-shutoff phase and after switch-off of the ignition of the engine, the ambient temperature which is significant for the start is detected. For vehicles which do not have a special ambient air temperature sensor, the ambient temperature is advantageously measured with the aid of the intake temperature which in most engines is detected by the electronic control apparatus. The ambient temperature significant for the start is preferably that temperature which is expected for starting under the most unfavorable conditions. In the embodiment, the governing ambient temperature is obtained in that the lowest measured intake temperature is measured over the last ten operating cycles of the engine. A valid operating cycle is one wherein an engine temperature of at least 85° C. is reached. In very simple embodiments, the governing ambient temperature can be made equal to the intake temperature present when the engine is switched off.

In the following step s2.SG1, the battery charging condition BLZ of the battery is measured. This takes place with the aid of acid density. A conventional battery in the charged condition has an acid density of 1.28 kg/liter, in the half-charged condition, it has an acid density of typically 1.18 kg/liter and in the discharged condition an acid density of typically 1.08 kg/liter. The acid density can be detected directly relatively well; however, this density can also be detected indirectly with the aid of a conductivity measurement. The charging condition of a battery together with the temperature of the battery is a good measure as to whether an engine, which likewise has the temperature of the battery, can still be started. For a battery of 60 Ah capacity, the battery must be approximately still half charged so that at −20° C., a typical engine with approximately 2 liter displacement can still be started. If the temperature drops further only slightly, namely to approximately −25° C., a battery of the above-mentioned capacity must be fully charged in order to still be able to start the above-mentioned engine.

In step s3.SG1, the battery charging condition BLZ is compared to a battery charging condition threshold BLZSW(θ) dependent upon the governing ambient temperature θ with the threshold value being so selected that it indicates that the engine can just be still started with the battery in the determined condition when the battery and the engine have the governing ambient temperature in the starting case. If in step s3, it is determined that the mentioned threshold is not exceeded, then the end of the delayed-shutoff phase takes place immediately. Otherwise, delayed-shutoff functions continue.

The first delayed-shutoff function in the method sequence according to the flowchart shown is a hot-start delayed-shutoff function which is carried out in a step s6.SG1 but only then when the engine temperature TMOT measured previously in step s4.SG1 does not exceed a threshold engine temperature TMOTSW. This last-mentioned condition is investigated in a step S5.SG1. If the engine temperature TMOT does not exceed or no longer exceeds the threshold TMOTSW, then the hot-start delayed-shutoff function according to step s1.SG1 is not carried out or no longer carried out.

A step s7.SG1(SG2) continues from step s5 or from step s6 in dependence upon whether the hot-start delayed-shutoff function is carried out or not. In step s7.SG1(SG2), it is investigated by interrogating flags as to whether burn-off times for a first and a second hot wire have elapsed. The first flag is set by control apparatus SG1 and the second flag by control apparatus SG2. The interrogation of the flags is performed by control apparatus 1. If it is determined that the times have elapsed, then the control apparatus 1 investigates in a step s11.SG1 as to whether the engine temperature TMOT has dropped below the threshold TMOTSW. If this is the case, then the method is ended, otherwise, the method returns to step s2.

If in contrast, the question in step s7 is answered in the negative, then the control apparatus SG1 investigates in a step s8.SG1 as to whether the burn-off time for the first hot wire has already elapsed If this is not the case, then the burn-off of the first hot wire is switched on in a step s9.SG1 or is maintained. Step s2 then continues from step s9.SG1. If in contrast the determination is made in step s8 that the burn-off time for the first hot wire has elapsed, then in a following step s10.SG2(SG1) the burn-off of the second hot wire is begun or this step is maintained. Step s2 then continues once again. The designation s10.SG2(SG1) means that the second control apparatus SG2 takes care of the burn-off process for the second hot wire but that it receives information from the first control apparatus as to when the burn-off can begin.

It is noted that the burn-off of the two hot wires in the embodiment does not take place during times determined by one or two values; instead, the time span after which the burn-off is ended, is made in dependence upon as to how long the engine is operated before switch-off of the ignition. The engine temperature is in addition considered. If the engine temperature is below 80° C. at the switch-off of the ignition, then the assumption can be made that the engine was operated only a short time at low load, that is without hardly taking in air since the last burn-off and for this reason, no renewed burn-off is required.

In the embodiment, the hot-start delayed-shutoff function and a burn-off function can run parallel next to each other. This is so because for the usual hot-start delayed-shutoff function only a relatively low current flow of 1 A is required. The method can however easily be changed in that (in correspondence to how this is described for the two delayed-shutoff functions), before starting each new function (that is, for example, the hot-start delayed-shutoff function) a check is made as to whether a previously started function has already run through.

In connection with the hot-start delayed-shutoff function, it is noted further that the above-mentioned current of under 1 A is critical less because of its intensity than because of its possible duration. Even with the embodiment wherein the engine temperature is monitored in order to end the hot-start delayed-shutoff function, this function typically runs for approximately 10 to 20 minutes. In special cases, an hour is reached or even exceeded, that is, the time duration which is pregiven for usual hot-start delayed-shutoff functions pregiven for delayed shutoff. It is advantageous (and not shown in the flowchart) to limit the time of the hot-start delayed-shutoff function so that in special cases wherein the engine temperature does not drop below the threshold temperature (that is in a start delayed-shutoff process) the delayed-shutoff function is not carried out indefinitely. Instead, it is deliberately brought to a conclusion.

In the embodiment, two engine controlling control apparatus are coupled with each other which in principle are equal but with the first control apparatus having priority for the delayed-shutoff functions. Accordingly, it is presupposed that the hot-start conditions for the second engine bank are the same as for the first and that therefore in the fuel-metering system for the second bank, vapor bubbles are formed under the same conditions as for the first bank.

The embodiment combines three principles with each other for protecting the battery: (a) the current-supplying capacity of the battery is monitored and when the battery is too weak, the delayed-shutoff phase is terminated or forbidden; (b) delayed-shutoff functions are not only time limited, instead, they are then ended or not even started when monitored operating conditions show that a termination or not carrying out of the delayed-shutoff function is possible without the danger of significant disadvantages during starting of the engine; and, (c) various delayed-shutoff functions are carried out sequentially rather than in parallel.

These three principles can be carried out only individually or in component combinations. Further combinations are dependent from the number of control apparatus coupled with each other. In the embodiment, two control apparatus are coupled with each other. Advantages with respect to the state of the art are however already then achieved when, in the case of several control apparatus, each for itself utilizes at least one of the above-mentioned three principles. It is however apparent that it is more advantageous if the control apparatus exchange informations with respect to delayed-shutoff functions with each other so that, for example, not only the delayed-shutoff functions, monitored by one single control apparatus take place sequentially; instead, that all delayed-shutoff functions which are monitored by the various control apparatus, take place sequentially especially those which require a high current flow. It is not only possible to connect engine control apparatus with each other; instead, the information exchange can lead to additional control apparatus which, for example, are responsible for transmission functions, steering functions or chassis functions.

If several control apparatus are available, then it is advantageous to carry out the relatively complex monitoring of current-supplying capacity of the battery by only one control apparatus which then advises all control apparatus as to whether delayed-shutoff functions are permissible and if yes, at which time point. If the delayed-shutoff phase is deliberately ended because of a current-supplying capacity of the battery which is too low, emergency functions can still be carried out in advance of the final switch-off of the current consumer. In the embodiment, the foregoing was however not necessary.

Figure 2:
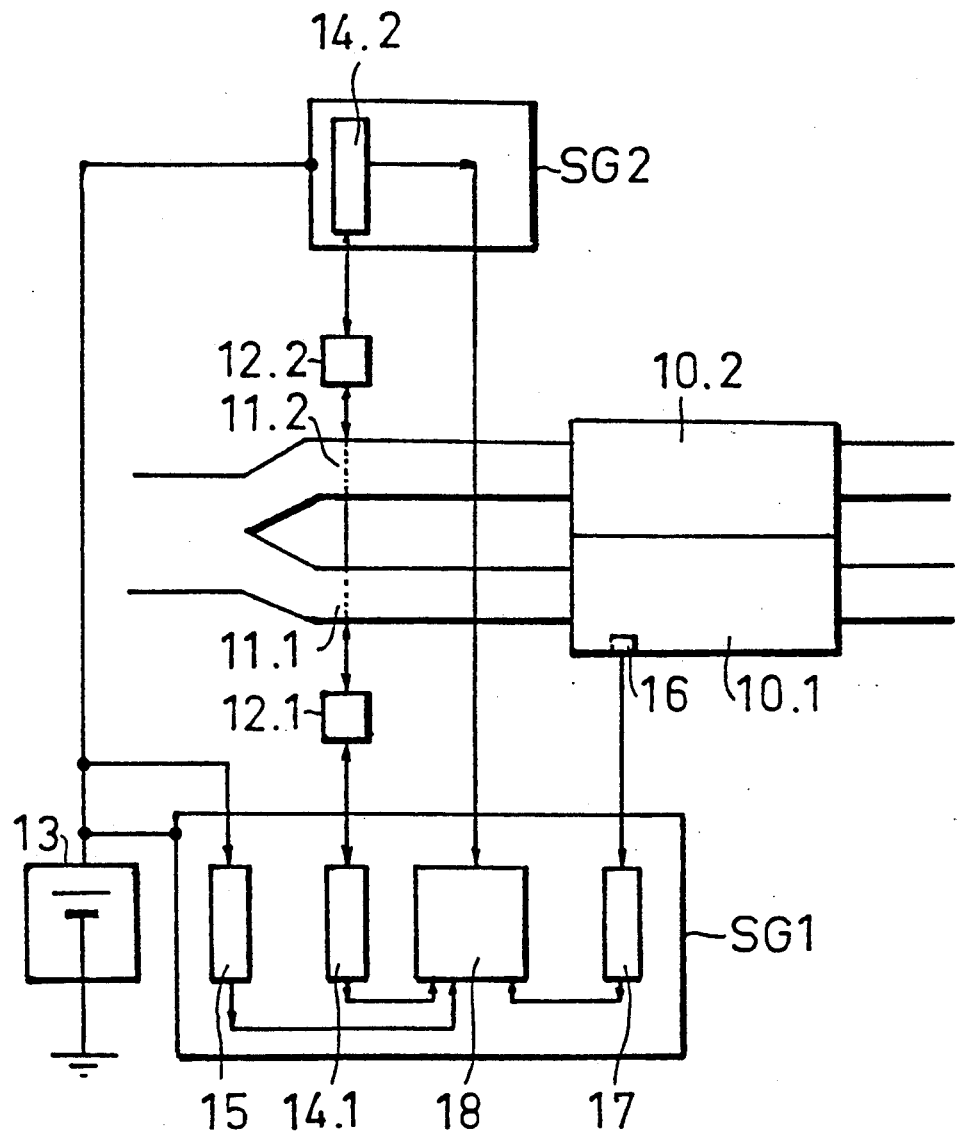

The block diagram of FIG. 2 shows a combustion engine having two cylinder banks 10.1 and 10.2 of which each is subjected to engine control via a corresponding first control apparatus SG1 and a second control apparatus SG2, respectively. Hot-wire air sensors 11.1 and 11.2 are mounted in the intake pipes, respectively, of both banks with respective assigned driver/-measuring units 12.1 and 12.2. With these units, air measurement controls 14.1 and 14.2 carry out a signal exchange in the control apparatus. The control apparatus SG1 and SG2 are supplied with voltage by a battery 13 which also serves as a starter battery.

Whereas in the second control apparatus SG2, only the air-flow measurement control 14.2 is provided, the first control apparatus SG1 has, in addition to the air-flow measurement control 14.1, the following: a battery condition monitor 15 for carrying out step s5.SG1 of FIG. 1, an engine temperature comparator 17 connected to a temperature sensor 16 at the engine and a sequence control 18. The engine temperature comparator operates as a delayed-shutoff variable comparator; this comparator carries out the steps s5.SG1 and s11.SG1. The sequence control 18 controls the overall sequence according to the flowchart of FIG. 1.

It is understood that the foregoing description is that of the preferred embodiments of the invention and that various changes and modifications may be made thereto without departing from the spirit and scope of the invention as defined in the appended claims.

We claim:

1. A method for operating at least one control apparatus in a delayed-shutoff phase after the ignition of an internal combustion engine of a motor vehicle equipped with a starter battery has been switched off wherein individual delayed-shutoff functions related to the engine are inhibited from the beginning of the delayed-shutoff phase or terminated thereafter to protect the battery from being run down to a level whereat the battery is rendered ineffective for restarting the engine, the method comprising the steps of:

presetting a threshold value of a variable which is so selected that, when the actual value of the variable reaches the threshold value, a particular delayed-shutoff function is terminated without significantly deteriorating the operability of the battery with said variable being indicative of the operational condition of said battery;

monitoring the value of the variable after said ignition is switched off and during said delayed-shutoff phase; and, then, when the measured value of said variable reaches the threshold value, terminating said particular delayed-shutoff function.

2. The method of claim 1, further comprising the steps of: measuring the engine temperature in the delayed-shutoff phase; and, terminating all delayed-shutoff functions in combination with a hot-start process or preventing said delayed-shutoff functions in combination with said hot-start process from starting when said engine temperature drops below or is below a pregiven value.

3. The method of claim 1, wherein said threshold value is dependent upon operating conditions in the operating state of the engine before switch off of said ignition.

4. The method of claim 3, wherein the time for burning off the hot wire of an air-flow sensor is determined in dependence upon the operating time of said engine before the start of the delayed-shutoff phase.

5. The method of claim 1, wherein delayed-shutoff functions, especially those requiring a high current flow, are carried out sequentially.

6. The method of claim 1, wherein the engine has first and second cylinder banks and first and second control apparatuses for controlling engine functions in said cylinder banks, respectively; and, wherein delayed-shutoff functions are performed for said first and second control apparatuses by one of said control apparatuses.

7. The method of claim 1, wherein a plurality of control apparatus are present of which one monitors the current-supplying capacity of the battery and transmits to the other apparatus whether the remaining ones of said apparatus can carry out delayed-shutoff functions in view of the determined current-supplying capacity and if required, how long.

8. A method for operating at least one control apparatus in a delayed-shutoff phase after the ignition of an internal combustion engine of a motor vehicle equipped with a starter battery has been switched off wherein individual delayed-shutoff functions are inhibited from the beginning of the delayed-shutoff phase or terminated thereafter to protect the battery from being run down to a level whereat the battery is rendered ineffective for restarting the engine, the method comprising the steps of:

monitoring the current-supplying capacity of the battery of the engine after said ignition is switched off; and, terminating the delayed-shutoff functions or preventing said delayed-shutoff functions ab initio when the current-supplying capacity has such values that said capacity is essentially only adequate for again starting the cooled-down engine.

9. The method of claim 8, wherein the ambient temperature and the charge condition of the battery are measured to determine the current-supplying capacity of the battery.

10. The method of claim 9, wherein the lowest ambient temperature within a pregiven time span is used as the governing ambient temperature for the starting case.

11. An arrangement for operating at least one control apparatus in a delayed-shutoff phase after the ignition of an internal combustion engine of a motor vehicle equipped with a starter battery is switched off, the arrangement being for inhibiting the delayed-shutoff functions from the beginning of the delayed-shutoff phase or terminating the delayed-shutoff functions thereafter to protect the battery from being run down to a level whereat the battery is rendered ineffective for restarting the engine, the arrangement comprising:

- sensor means for monitoring a variable indicative of the operational condition of said battery after said ignition is switched off;
- a comparator for continuously comparing the actual value of said variable to a threshold value;
- means for emitting a signal for terminating the particular delayed-shutoff function when the actual value reaches the threshold value; and,
- said delayed-shutoff variable being a variable which is so selected that then, when the actual value of the variable reaches the threshold value, the particular delayed-shutoff function is terminated without significantly deteriorating the operability of the battery.

12. The arrangement of claim 11, further comprising a battery condition monitoring unit for emitting a signal for terminating the delayed-shutoff functions or for inhibiting said delayed-shutoff functions ab initio when the current-supplying capacity of the battery is essentially only adequate for again starting the cooled-down engine.

13. The arrangement of claim 11, further comprising a sequence control unit for sequentially carrying out especially those delayed-shutoff functions which require a high current flow.

* * * * *